UNITED STATES PATENT OFFICE.

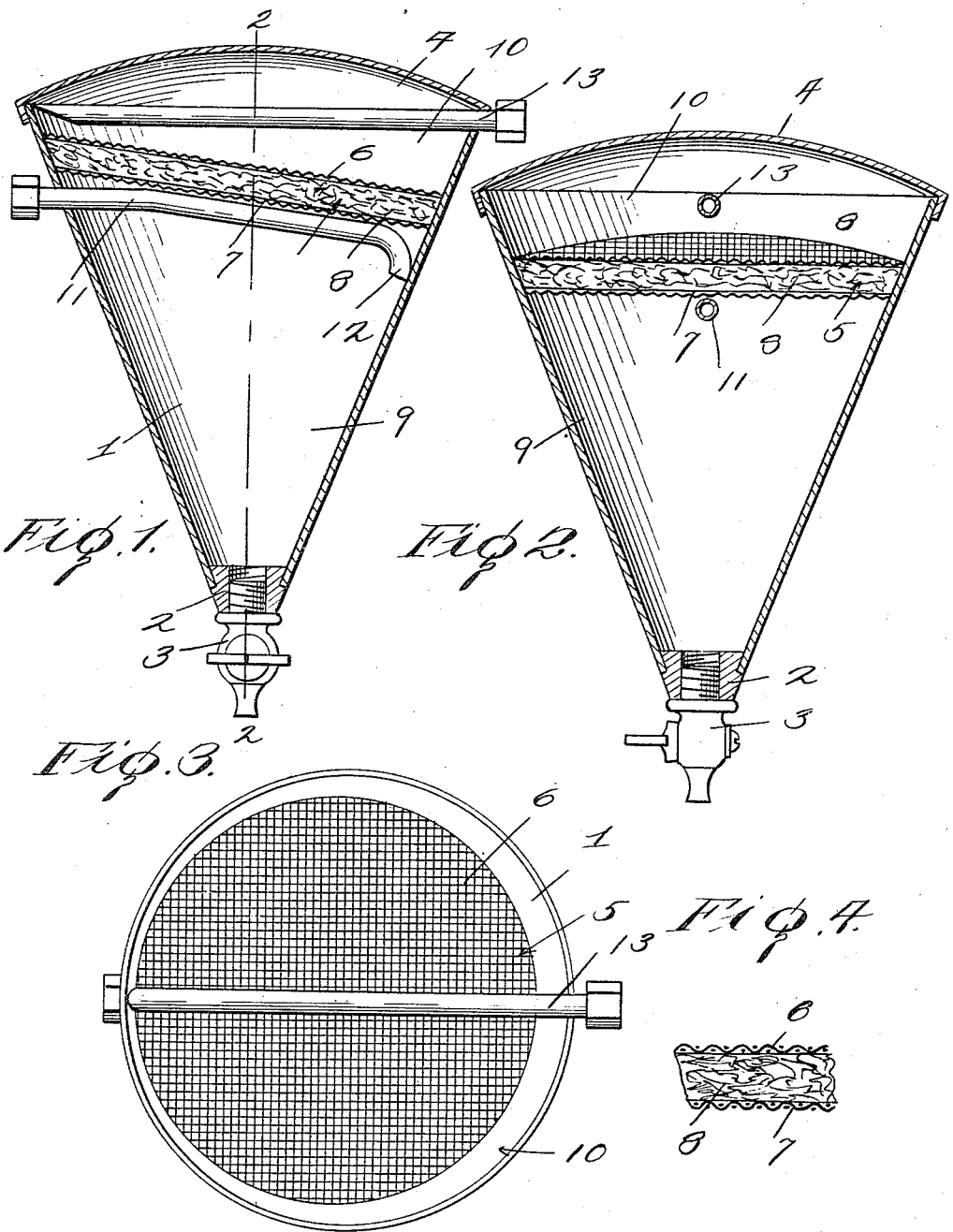

ADOLPH STORM, OF THOMPSON, IOWA.

FILTER.

1,235,395.

Specification of Letters Patent.   Patented July 31, 1917.

Application filed October 11, 1916.   Serial No. 125,033.

*To all whom it may concern:*

Be it known that I, ADOLPH STORM, a citizen of the United States, residing at Thompson, in the county of Winnebago, State of Iowa, have invented certain new and useful Improvements in Filters; and I do hereby declare the following to be a full, clear, and exact description of the invention, such as will enable others skilled in the art to which it appertains to make and use the same.

This invention relates to filters and is particularly designed for filtering water and solid impurities from gasolene. The light construction is very desirable in a filter designed as is this, for installation on an automobile, and it is the object of my invention to utilize the inlet and outlet pipes not only for the inlet and outlet of the gasolene with such relation to the filtering medium as to establish currents that free the filtering medium of matter that may adhere thereto, but also to utilize the inlet and outlet pipes in the bracing and consequent strengthening of the structure.

It is a specific object to establish a gasolene current flow transversely of the screen forming the lower element of the filtering medium so as to carry transversely and off from such screen the solid particles as well as water globules that would otherwise lodge into the openings of the screen and carry into or through the filtering medium, as the case may be.

With the above objects in view and such other objects as may hereinafter appear, my invention will now be fully set forth and described, reference being had to the accompanying drawings.

In the drawings:—

Figure 1 is a vertical section through the device,

Fig. 2 is a section on line 2—2 of Fig. 1,

Fig. 3 is a top plan view of the device with the cover plate removed.

Fig. 4 is an enlarged detail section of the filtering medium.

Referring more particularly to the drawings 1 represents a casing which is conical in form, the apex of the receptacle being directed downwardly and terminating in a threaded bushing 2 which receives the plug 3, the latter upon removal permitting the sediment collected in the bottom of the apex of the receptacle 1 to drain off. The upper or larger end of the conical receptacle 1 is provided with the rounded cover plate 4, the latter inclosing the upper compartment of the filter. Extending transversely across the casing 1 a comparatively short distance below the cover plate 4 is the filtering element 5. The latter consists of an upper fine metal gauze diaphragm 6, a corresponding gauze diaphragm 7 and the matte of a filtering medium of suitable character 8 which is interposed between the gauze diaphragms 6 and 7. This filtering element is suitably secured in position and entirely spans the receptacle 1 in a sloping or diagonal direction so that a compartment 9 and a compartment 10 are formed. Entering the compartment, 9 just below the filtering element 5 is an inlet pipe 11, the latter preferably extending across the compartment 9 and having the downturned end 12 which directs the fluid entering the compartment downwardly along the wall thereof. Fluid entering the pipe 12 thus passes downwardly toward the bottom of the compartment 9 and then rises to pass through the filtering element 5. The upper compartment 10 is provided with a draw-off pipe 13 which also extends substantially across the entire width of the compartment, the inlet end of the pipe being cut diagonally as illustrated in Fig. 1 so as to effect an orifice opening in the direction of the uppermost portion of the filtering medium.

The compartment 9 thus provides a receiving and settling chamber, and since the fluid rises through the medium 8, and furthermore is not directed thereagainst by means of the pipe 11, a comparatively little sediment settles against the filtering medium or element. On the other hand, it drops downwardly and being directed toward a common center by means of conical bars of the compartment 9 is readily withdrawn when the plug 3 is removed. The device is thus substantially self-cleaning. Since the device is normally wholly inclosed it will normally stand filled with gasolene, that below the filtering element 5 being obviously unfiltered, but that which rises above the filtering element 8 being filtered and ready for use. It is obvious that I have thus provided a practical and highly efficient device for gasolene and similar fluid fuels, it being one which will remain in operative condition for a comparatively long period without cleaning. The fluid is not forced therein but rises naturally and easily, so that there is little danger of sediment being carried through the filtering medium.

What I claim is:—

A gasolene filter consisting of a thin walled receptacle having a filtering medium disposed in an inclined plane entirely across the receptacle and spaced from its ends, an outlet pipe entering the receptacle above the lowermost portion of the filtering medium and extending against the diametrically opposite wall of the receptacle directly above the uppermost portion of the filtering element and having an orifice opening in the direction of said uppermost portion, and an inlet pipe entering through the opposite wall of the receptacle from the first named pipe and extending diametrically of the receptacle against the wall of the receptacle directly opposite to its entrance and having an orifice disposed downwardly and beneath the lowermost point of the filtering medium, said pipes serving to brace the thin material of the receptacle.

In testimony whereof, I affix my signature, in the presence of two witnesses.

ADOLPH STORM.

Witnesses:
E. C. O'HAIR,
O. C. THOERHEIM.

Copies of this patent may be obtained for five cents each, by addressing the "Commissioner of Patents, Washington, D. C."